United States Patent [19]

Obata

[11] Patent Number: 5,319,185
[45] Date of Patent: Jun. 7, 1994

[54] SMALL-SIZE HAND-SUPPORTED BAR CODE READER

[75] Inventor: Kenzo Obata, Okazaki, Japan
[73] Assignee: Nippondenso Co., Ltd., Kariya, Japan
[21] Appl. No.: 917,714
[22] Filed: Jul. 24, 1992

[30] Foreign Application Priority Data

Jul. 24, 1991 [JP] Japan .................................. 3-207371
Jun. 25, 1992 [JP] Japan .................................. 4-167423

[51] Int. Cl.$^5$ ............................................. G06K 7/10
[52] U.S. Cl. ..................... 235/472; 235/455; 235/475
[58] Field of Search ................ 235/467, 472, 475, 455

[56] References Cited

U.S. PATENT DOCUMENTS 3,978,318 8/1976 Romeo et al. .
4,766,299 8/1988 Tierney et al. .
5,136,145 8/1992 Karney ............................... 235/472

FOREIGN PATENT DOCUMENTS 58-138157 9/1983 Japan .

OTHER PUBLICATIONS

"Principle of SLA", Selfoc Lens Array, pp. 13-20 (w/partial English translation).

Primary Examiner—Harold Pitts
Attorney, Agent, or Firm—Cushman, Darby & Cushman

[57] ABSTRACT

A bar code reader has a sensor unit to be mounted on an operator's finger and a decoder unit to be mounted on an operator's wrist, the sensor and decoder units being electrically connected by a cable. The sensor unit has a light-emitting device for emitting light toward a bar code to be read, a graded-index rod lens array for focusing an entire linear optical image of the bar code at one time in substantially the same size as the bar code, and a line image sensor such as a CCD for photoelectrically converting the entire linear optical image focused by the optical means into an electric signal. The decoder unit decodes the electric signal from the line image sensor. The light-emitting device, the rod lens array, and the line image sensor are housed in a hollow casing. A movable tubular member is movably disposed in the hollow casing and has an end wall for abutment against the bar code. A switch for energizing the light-emitting device and the decoder unit is fixedly mounted in the hollow casing and triggerable by the movable tubular member when the movable tubular member is moved by abutment of the end wall thereof against the bar code.

14 Claims, 9 Drawing Sheets

SMALL-SIZE HAND-SUPPORTED BAR CODE READER

BACKGROUND OF THE INVENTION

1. Field of the Invention

The present invention relates to a bar code reader, and more particularly to a portable, small-size hand-supported bar code reader.

2. Description of the Prior Art

Some portable hand-held scanning bar code readers employ a charge-coupled device (CCD) combined with an image-reducing optical system including a spherical lens. A light beam emitted by a light source is applied to a bar code, and reflected light from the bar code is reflected by a mirror and then focused by the spherical lens onto the CCD. The CCD converts the focused light into an electric signal whose intensity varies with time depending on the information represented by the bar code. The electric signal produced by the CCD is then amplified by an amplifier, converted into a binary signal by a binary signal generator, and decoded into a decoded signal by a decoder. The decoded signal is outputted from the bar code reader through an interface.

During use of such a portable hand-held scanning bar code reader, the operator is required to hold the bar code reader by hand. Since one hand of the operator is occupied by the bar code reader, the operator can only use the other hand or may have to pass the bar code reader to the other hand to do some other work. Therefore, the efficiency of the job which the operator performs while holding the bar code reader by hand is considerably low.

Attempts have been made to reduce the size of portable scanning bar code readers. One small-size portable bar code reader is disclosed in Japanese laid-open utility model publication No. 58-138157. The disclosed bar code reader is a pencil-shaped bar code reader that can be mounted on an operator's finger. The pencil-shaped bar code reader is relatively long, and suffers frequent reading errors because it is required to trace bar codes in order to read them. U.S. Pat. No. 4,766,299 discloses a hand-mounted bar code reader. The disclosed hand-mounted bar code reader is however relatively large in size as its housing accommodates a conventional laser and scanning mechanism for producing a scanning laser beam. U.S. Pat. No. 3,978,318 shows a hand-operated scanner that can be worn by an operator's finger. However, the disclosed hand-operated scanner is also relatively large in size, and must to be moved over a data bearing medium in order to read the data.

Furthermore, the optical system of the conventional scanning bar code readers has imposed certain limitations on efforts to make them smaller in size. Inasmuch as the scanning bar code readers have an image-reducing optical system including a spherical lens, as described above, if the focal length of the optical system between the bar code and the spherical lens is to be shortened to reduce the size of the bar code reader, then it is necessary to employ a smaller spherical lens with a reduced radius of curvature. The smaller spherical lens would however be unable to provide a light intensity strong enough to detect a bar code image on the CCD. Since the spherical lens is required to focus the reflected light from the bar code into a smaller bar code image on the CCD, the spherical lens should have a certain focal length that is necessary between itself and the CCD. Therefore, it has been impossible for scanning bar code readers to be greatly reduced in size because of those optical system limitations.

SUMMARY OF THE INVENTION

In view of the aforesaid drawbacks of the conventional portable scanning bar code readers, it is an object of the present invention to provide a hand-supported bar code reader which is free of frequent reading errors and small enough so that the operator of the bar code reader can have both hands available for some other work while using the bar code reader.

According to the present invention, there is provided a bar code reader comprising a casing adapted to be mounted on an operator's finger, the casing having an opening member disposed therein for abutment against a bar code, light-emitting means disposed in the casing for emitting light through the opening member toward the bar code, focusing means disposed in the casing for focusing an optical image of the bar code represented by light reflected from the bar code, in substantially the same size as the bar code, signal output means disposed in the casing for outputting an information signal indicative of the optical image focused by the focusing means, and a decoder adapted to be mounted on an operator's arm for decoding the information signal from the signal output means. The focusing means comprises a graded-index rod lens array for transmitting the light reflected from the bar code along periodic curved ray trajectories therethrough and emitting the light therefrom.

According to the present invention, there is also provided an optical information reader for optically reading information on an information bearing medium, comprising light-emitting means for emitting light, focusing means for focusing the light emitted from the light emitting means on the information bearing medium in substantially the same size as the emitted light, photosensitive means for detecting light reflected from the information bearing medium and generating an information signal indicative of the detected light, and reading means for reading the information on the information bearing medium based on the information signal from the photosensitive means.

According to the present invention, there is provided a bar code reader comprising a sensor unit adapted to be mounted on an operator's finger, the sensor unit comprising light-emitting means for emitting light toward a bar code to be read, optical means for focusing an entire linear optical image of the bar code at one time in substantially the same size as the bar code, and a line image sensor for photoelectrically converting the entire linear optical image focused by the optical means into an electric signal. The bar code reader also has a decoder unit adapted to be mounted on an operator's wrist, for decoding the electric signal from the line image sensor, the sensor unit and the decoder unit being coupled to each other in signal transmitting relationship.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
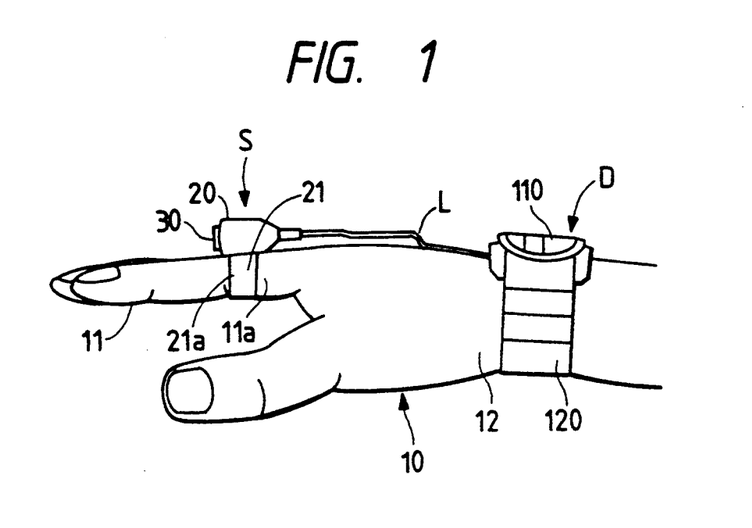
FIGS. 1 and 2 are side elevational views of a bar code reader according to an embodiment of the present invention, the bar code reader being mounted on the right hand of an operator.
Figure 2:
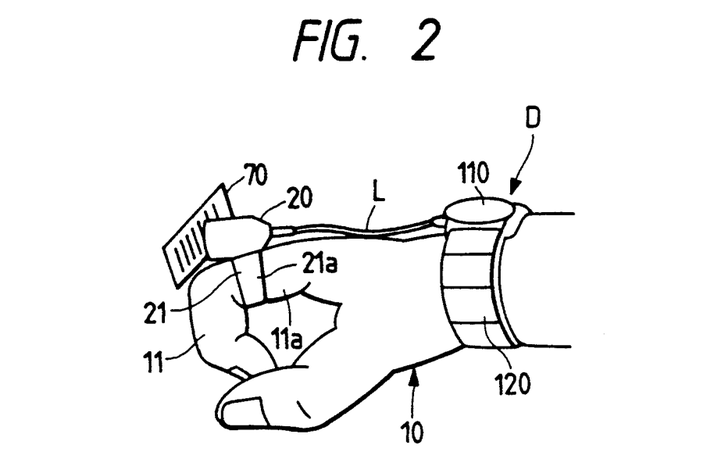

FIGS. 1 and 2 show a bar code reader according to an embodiment of the present invention. As shown in FIGS. 1 and 2, the bar code reader is a portable, small-size bar code reader which can be supported on an operator's hand.

In FIGS. 1 and 2, the bar code reader is shown as being mounted on a right hand 10. The bar code reader comprises a sensor unit S mounted on an index finger 11 at its third finger bone or phalanx portion 11a, a decoder unit D, which looks like a wristwatch, mounted on a wrist 12, and an interface unit I (see FIG. 3).

The sensor unit S comprises a flat tubular casing 20 which is elongated in a direction normal to the sheet of FIGS. 1 and 2, and an attachment 21 having two curved legs 21a, 21b (see also FIG. 4) extending outwardly from the center of a lower outer peripheral surface of the flat tubular casing 20. The flat tubular casing 20 is firmly mounted on the index finger 11 by the legs 21a and 21b which grip the third finger bone portion 11a therebetween.

Figure 4:
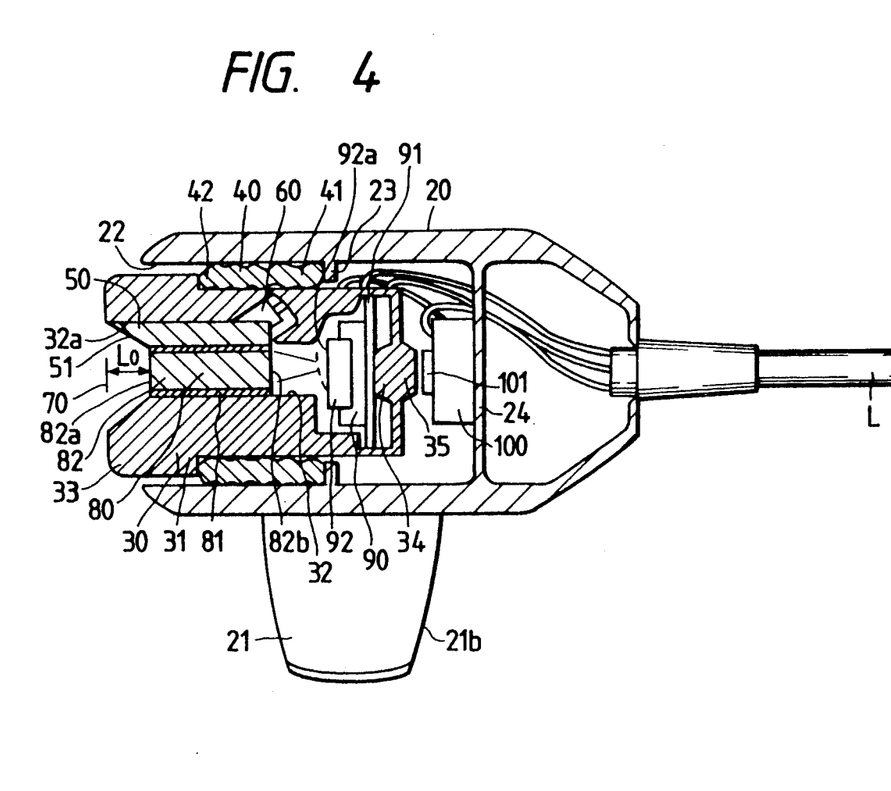
FIG. 4 is a vertical cross-sectional view of the sensor unit.

As shown in FIG. 4, the flat tubular casing 20 has an opening 22 defined therein which houses a movable flat tubular member 30 that is axially movably disposed in the opening 22 with an annular rubber member 40 interposed radially between an inner wall surface of the flat tubular casing 20, which defines the opening 22 and an outer circumferential surface of the flat tubular member 30. The flat tubular member 30 is elongate in a direction normal to the sheet of FIG. 4. The annular rubber member 40 has an inner end 41 held against an annular wall 23 projecting radially inwardly into the opening 22 from a central portion of the inner wall surface of the flat tubular casing 20 The annular rubber member 40 also has an outer end 42 engaging an annular step 31 on the outer circumferential surface of the flat tubular member 30. The annular rubber member 40 normally urges the flat tubular member 30 in an axial direction to move an annular outer end wall 33 thereof out of the opening 22 in the flat tubular casing 20. The annular rubber member 40 also serves as an elastic seal to prevent water, dust, and other foreign matter from entering the flat tubular casing 20.

The flat tubular member 30 has a laterally elongate recess 32 defined therein. The sensor unit S also has a diffusion plate 50 fixed to an upper wall 32a of the flat tubular member 30 above the recess 32. A light-emitting device 60, which comprises a light-emitting diode 61, (see FIG. 9) is fitted in a central region of the inner end of the diffusion plate 50 and is oriented to direct emitted light into the diffusion plate 50. The diffusion plate 50 serves to diffuse the light emitted by the light-emitting device 60 and emits the diffused light out of a slanted outer end surface 51 in a direction substantially perpendicular thereto.

The slanted outer end surface 51 is inclined with respect to a vertical central plane (FIG. 4) in the recess 32 by an angle which is selected to direct the diffused light emitted from the slanted outer end surface 51 toward a bar code 70. The bar code 70 vertically lies centrally at the annular outer end wall 33 in a plane substantially flush with the annular outer end wall 33.

Figure 5:
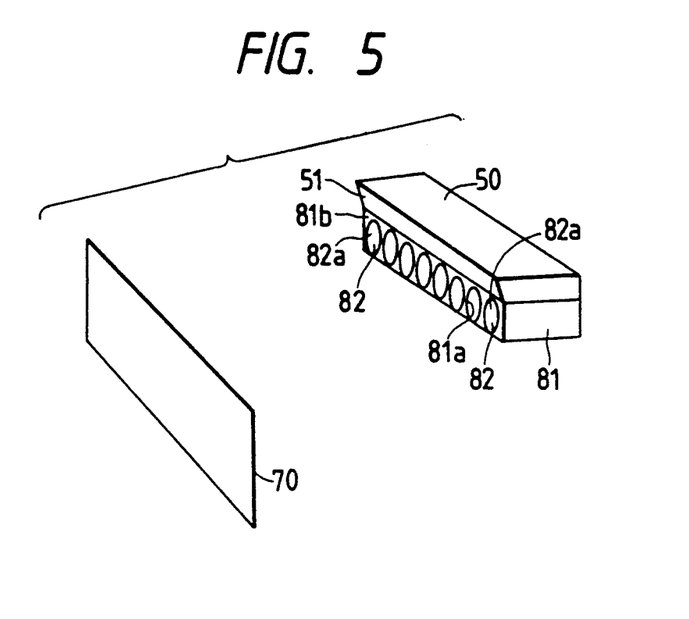
FIG. 5 is a perspective view of a bar code, and a rod lens array and a diffusion plate of the sensor unit.
Figure 7:
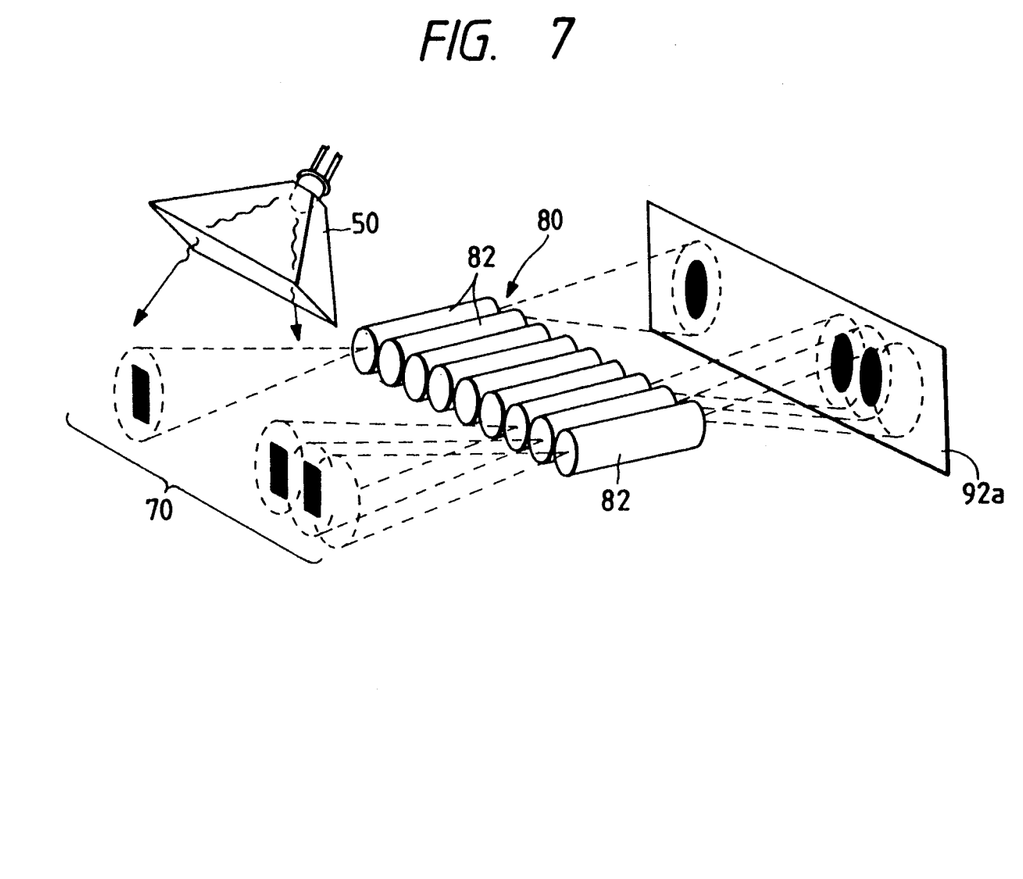
FIG. 7 is a schematic perspective view of the bar code, the rod lens array, and the diffusion plate.

As shown in FIG. 4, the sensor unit S also has a rod lens array 80 fitted in the recess 32 immediately below the diffusion plate 50. The rod lens array 80 has a length (in the direction normal to the sheet of FIG. 4) which is substantially the same as the length of the bar code 70. As shown in FIGS. 4, 5, and 7, the rod lens array 80 comprises a casing 81 in the shape of a rectangular parallelepiped, and a linear array of cylindrical rod lenses 82 fitted respectively in a plurality of parallel cylindrical holes 81a defined in the casing 81 in laterally spaced relationship.

Figure 6:
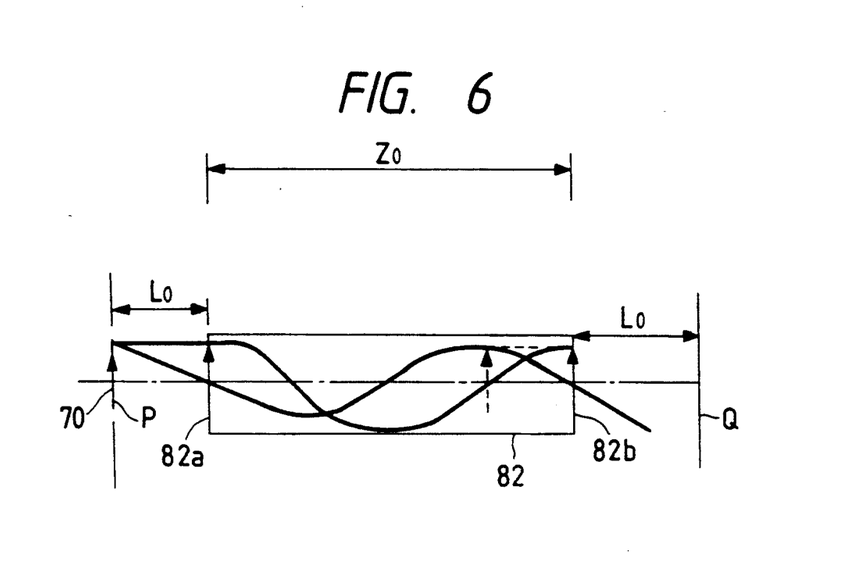
FIG. 6 is a diagram showing optical characteristics of the rod lens array.

Each of the rod lenses 82 comprises a graded-index lens whose refractive index increases radially outwardly from its optical axis. With reference to FIG. 6, the optical characteristics of each of the rod lenses 82 are defined as follows:

$$Lo = -\tan(Z_o \cdot \pi/T)/N_o \cdot \sqrt{A}$$

where Lo is either the distance between an object plane P corresponding to the bar code 70 and an entrance end 82a of the rod lens 82 or the distance between an exit end 82b of the rod lens 82 and an image plane Q, A is a graded index constant, No is the refractive index of the rod lens 82 on its optical axis, Zo is the axial length of the rod lens 82, and T is the pitch of periodic curved ray trajectories in the rod lens 82. In this embodiment, the distance Lo is in a range of from 2 to 3 mm.

When the light emitted from the diffusion plate 50 is applied to the object plane P, i.e., the bar code 70, light reflected by the bar code 70 enters the rod lens array 80 from the entrance end 82a, and travels therethrough along periodic curved ray trajectories as shown in FIG. 6. The light leaves the rod lens array 80 from the exit end 82b as a one dimensional light image which is focused on the image plane Q. The rod lens array 80 focuses a bar code image on the image plane Q in substantially the same size as the bar code 70.

As shown in FIG. 4, a line sensor 90 disposed behind the rod lens array 80 in the recess 32 comprises a base 91 and a charge-coupled device (CCD) 92 supported thereon. The base 91 is coaxially fixed to an inner central land 34 on the bottom wall of the flat tubular member 30 at the inner end of the recess 32 remote from the annular outer end wall 33. The CCD 92 is securely supported on the base 91 coaxially with the rod lens array 80 so that a photosensitive surface 92a of the CCD 92 faces the exit end 82a of each of the rod lenses 82, and extends parallel to the rod lens array 80. The photosensitive surface 92a lies in the image plane Q, and has an effective length (in the direction normal to the sheet of FIG. 4) which is substantially the same as the length of the bar code 70. The line sensor 90 detects the light emitted from the rod lens array 80 with the photosensitive surface 92a, and generates an electric signal indicative of the information represented by the bar code 70.

The flat tubular casing 20 of the sensor unit S also houses a normally-open trigger switch 100 fixed centrally to a partition 24 of the flat tubular casing 20 which is positioned behind and spaced from the bottom wall of the flat tubular member 30. The trigger switch 100 has a movable pusher 101 disposed coaxially with and spaced a small distance from an outer central land 35 on the bottom wall of the flat tubular member 30. When the flat tubular member 30 is moved to the right in FIG. 4, the outer central land 35 pushes the pusher 101 thereby closing or turning on the trigger switch 100. When the pusher 101 is closed, it supplies a direct current from a chargeable DC power supply Br (see FIG. 9), such as a storage battery, to the light-emitting device 60, thereby energizing the light-emitting diode 61 thereof.

Figure 8:
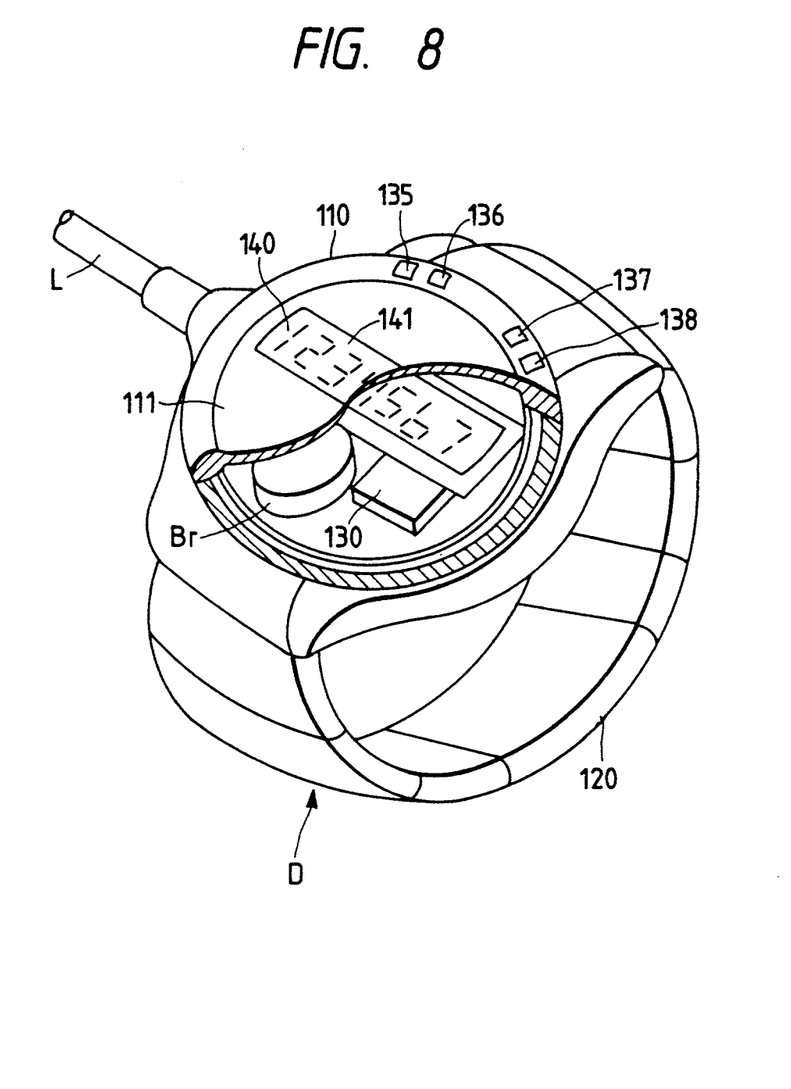
FIG. 8 is a perspective view, partly broken away, of the sensor unit.

As shown in FIGS. 1, 2, 3, and 8, the decoder unit D has a hollow circular casing 110 with an attachment 120 that looks like a wristwatch strap. In use, the decoder unit D is mounted on the wrist 12 with the attachment 120 placed around the wrist 12, as shown in FIGS. 1 and 2. As shown in FIG. 8, the casing 110 houses the chargeable DC power supply Br and an electronic circuit 130 therein. A display unit 140 is embedded in a circular surface panel 111 of the casing 110, and has an outer display surface 141 exposed for view.

Figure 9:
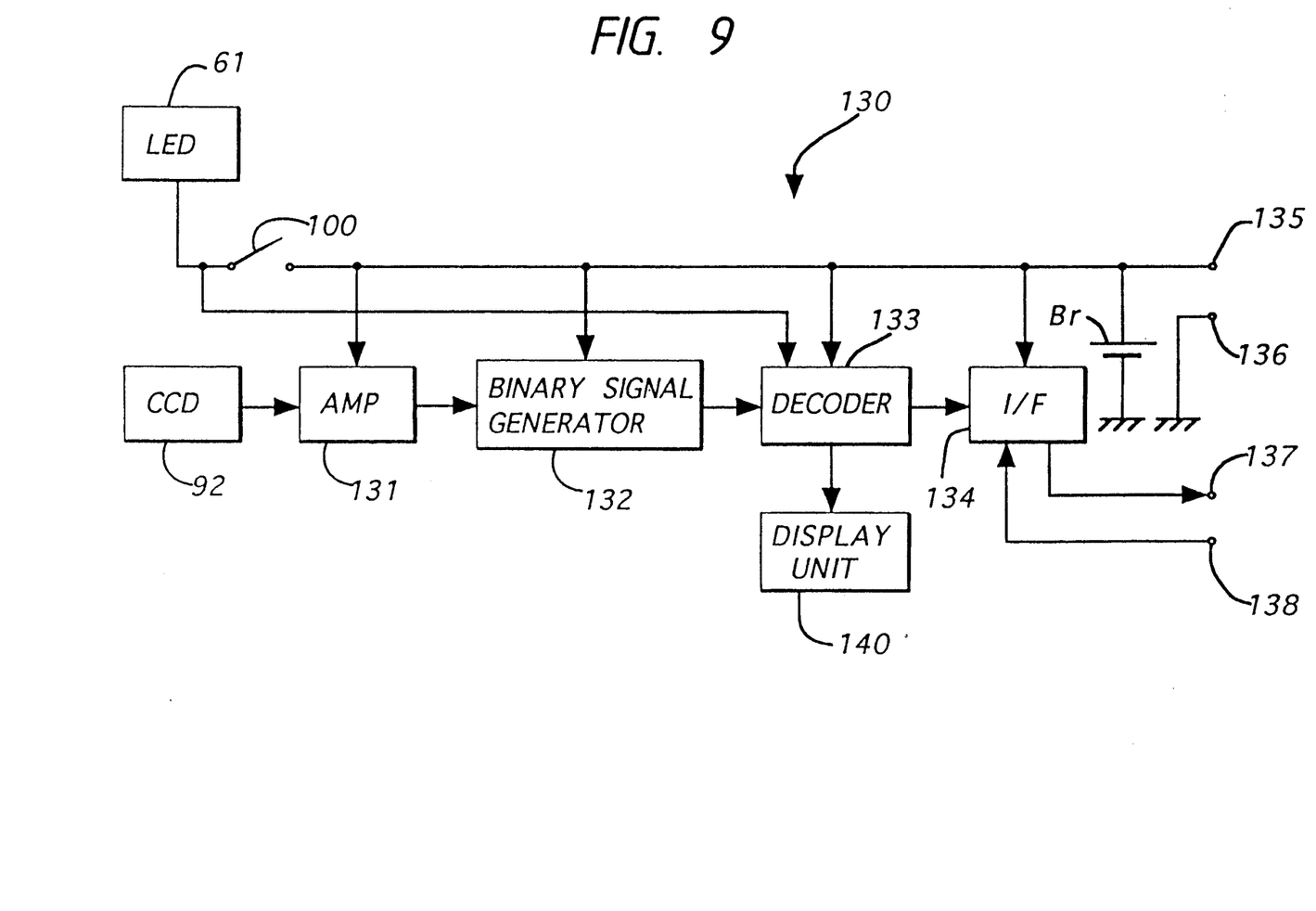
FIG. 9 is a block diagram of an electronic processing system of the sensor unit.

As shown in FIG. 9, the electronic circuit 130 comprises an amplifier 131 connected to the CCD 92, a binary signal generator 132 connected to the amplifier 131, a decoder 133 connected to the binary signal generator 132, and an interface 134 connected to the decoder 133. The amplifier 131 amplifies the electric signal from the CCD 92, and applies an amplified signal to the binary signal generator 132. The binary signal generator 132 converts the amplified signal into a binary signal.

In response to the closing of the trigger switch 100, the decoder 133 is triggered to decode the binary signal from the binary signal generator 132 into a decoded signal. The interface 134 has output and input terminals 137, 138. The interface 134 outputs the decoded signal from the decoder 133 through the output terminal 137. The display unit 140 displays the information represented by the decoded signal from the decoder 133.

The electronic circuit 130 has terminals 135, 136 for connection to an external power supply, the terminals 135, 136 being connected across the chargeable DC power supply Br for charging the DC power supply Br As shown in FIG. 8, the terminals 135, 136, 137, 138 of the electronic circuit 130 are positioned on an annular marginal edge of the circular surface panel 111 of the casing 110.

The DC power supply Br and the amplifier 131 in the decoder unit D are electrically connected to the light-emitting diode 61, the CCD 92, and the trigger switch 100 in the sensor unit S by a cable L shown in FIGS. 1, 2, 4, and 8.

Figure 3:
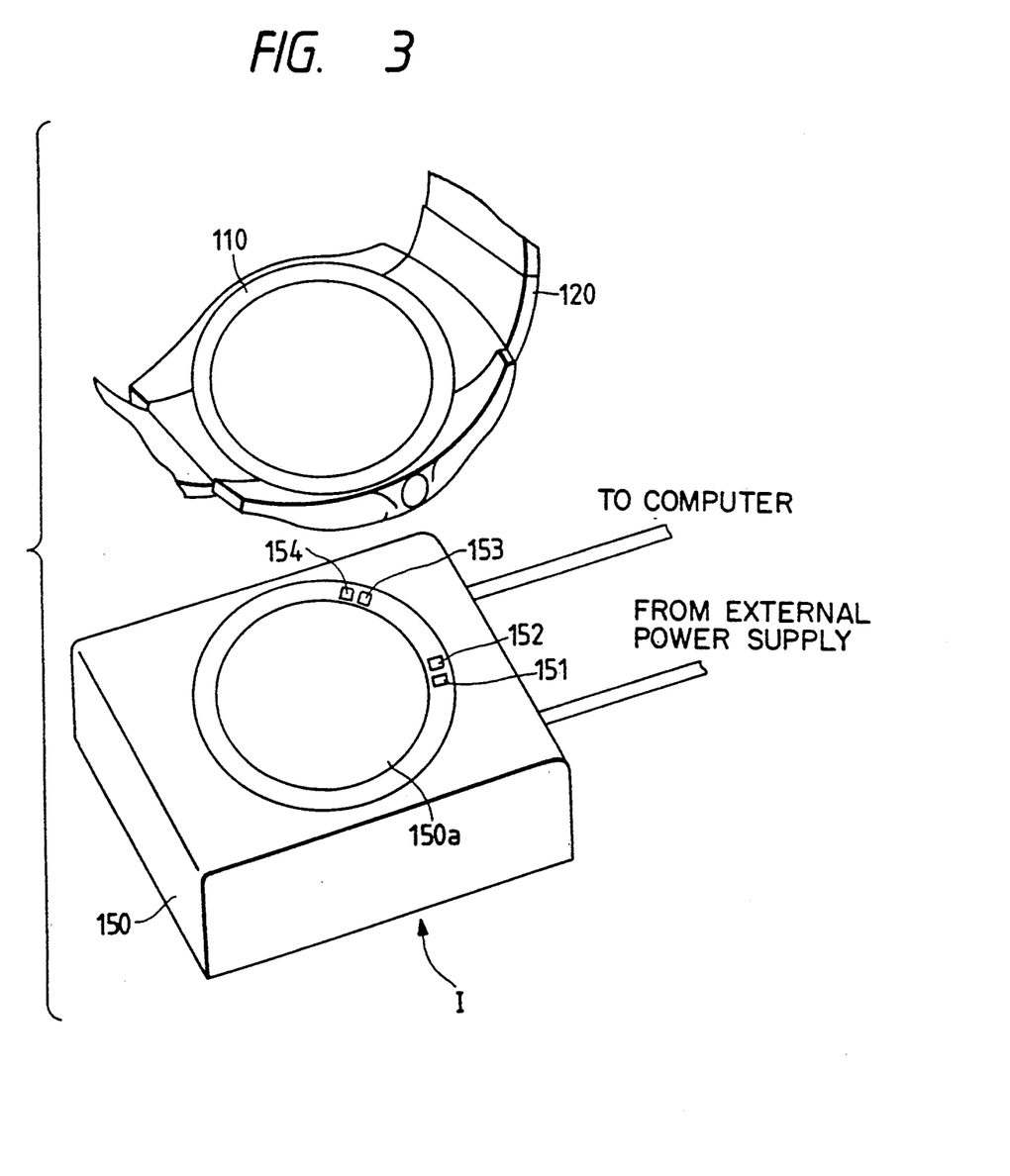
FIG. 3 is an exploded perspective view of a decoder unit and an interface unit of the bar code reader.

As shown in FIG. 3, the interface unit I has a base 150 with a recess 150a defined in its upper surface. The recess 150a is shaped complementarily to the surface panel 111 of the casing 110 of the decoder unit D. The interface unit I also has a plurality of terminals 151, 152, 153, 154 positioned in an annular marginal edge around the recess 150a. When the surface panel 111 of the casing 110 is placed in the recess 150a, the terminals 135, 136, 137, 128 on the annular marginal edge of the circular surface panel 111 of the casing 110 are held in contact with the terminals 151, 152, 153, 154, respectively.

The terminals 151, 152 are connected to an external power supply (not shown), and the terminals 153, 154 are connected to a computer (not shown). Therefore, when the surface panel 111 of the casing 110 is fitted in the recess 150a, connecting the terminals 135, 136, 137, 138 respectively to the terminals 151, 152, 153, 154, the DC power supply Br is charged by the external power supply, and the decoded signal is transmitted from the interface to the computer and data is transferred from the computer to the interface 134.

The bar code reader described above operates as follows: Before reading the bar code 70, the operator wears the decoder unit D and the sensor unit S on the right hand 10. More specifically, as shown in FIG. 1, the attachment 120 of the decoder unit D is placed around the wrist 12, and then the attachment 21 of the sensor unit S is put around the index finger 11 with the legs 21a, 21b gripping the third finger bone portion 11a.

After having mounted the decoder unit D and the sensor unit S on the right hand 10, the operator bends the index finger 11 and directs the opening 22 in the flat tubular casing 20 toward the bar code 70, as shown in FIG 2. Thereafter, the operator moves the sensor unit S until the outer end wall 33 of the flat tubular member 30 is pressed against the bar code 70 with the rod lens array 80 oriented parallel to the bar code 70. The flat tubular member 30 is displaced into the flat tubular casing 20 against the resiliency of the rubber member 40, causing the outer central land 35 to push the pusher 101 of the trigger switch 100. The trigger switch 100 is now closed.

The light-emitting diode 61 is energized by the DC power supply Br, emitting light into the diffusion plate 50. The light is diffused by the diffusion plate 50 and is emitted from the slanted outer end surface 51 toward the bar code 70. The decoder 133 is also energized when the trigger switch 100 is closed.

The diffused light applied from the slanted outer end surface 51 to the bar code 70 is reflected into each of the rod lenses 82 of the rod lens array 80 by the bar code 70. The reflected light travels through the rod lenses 82 along periodic curved ray trajectories as shown in FIG. 6, and then leaves the rod lens array 80 from the exit end 82b.

The light emitted from the exist ends 82b of the rod lenses 82 then falls on the photosensitive surface 92a of the CCD 92, as shown in FIG. 7. The diffused light reflected by the bar code 70 is focused on the photosensitive surface 92a of the CCD 92 by the optical action of the graded index of the rod lens array 80 according to the equation referred to above.

When the diffused light reflected by the bar code 70 passes through the rod lens array 80 and is focused on the photosensitive surface 92a of the CCD 92, the CCD 92 generates an electric signal representing the information of the bar code 70. The electric signal generated by the CCD 92 is amplified by the amplifier 131, and the amplified signal is converted by the binary signal generator 132 into a binary signal, which is applied to the decoder 133.

The decoder 133 decodes the binary signal into a decoded signal, which is supplied to the display unit 140 and the interface 134. In response to the decoded signal, the display unit 140 displays the information represented by the decoded signal, as bar code information indicated by the bar code 70.

After the bar code information has been displayed, the operator moves the outer end wall 33 of the annular tubular member 30 away from the bar code 70 The annular tubular member 30 is displaced outwardly under the bias of the rubber member 40, thereby shifting the outer central land 35 off the pusher 101 of the trigger switch 100. The trigger switch 100 is now opened, whereupon the light-emitting diode 61 and the decoder 133 are de-energized.

The operator removes the decoder unit D and the sensor unit S from the right hand 10, and places the surface panel 111 of the casing 110 in the recess 150a. Now, the terminals 135, 136, 137, 138 on the casing 110 are connected to the terminals 151, 152, 153, 154, respectively, on the base 150. The interface unit I outputs the decoded signal, which has been transmitted from decoder 133, to the computer, and receives any necessary data from the computer. At the same time, the DC power supply Br is charged by the external power supply.

The rod lens array 80 of the sensor unit S can focus the light reflected from the bar code 70 over a relatively short optical path because of the graded index thereof. Therefore, the rod lens array 80 has a relatively short focal length while propagating a sufficient intensity of light that can well be detected by the CCD 92. The sensor unit S may thus be small enough to be mounted on the index finger 11 of the user. Since the decoder unit D is separate from the sensor unit S, the decoder unit D may also be small enough to be mounted on the wrist 12 of the user. Accordingly, the bar code reader may be very small in size as compared with conventional portable hand mounted bar code readers.

To read the bar code 70, after the operator has installed the decoder unit D on the wrist 12 and the sensor unit S on the index finger 11, the operator is only required to press the sensor unit S against the bar code 70. It is not necessary to move the sensor unit S to scan the bar code 70. Consequently, the bar code reader is free of frequent reading errors which might be caused by moving the bar code reader to scan a bar code. The operator is not required to hold the bar code reader by hand. Therefore, while the operator is carrying the bar code reader in readiness for use or is actually using the bar code reader, the operator can have both hands free and available to do some other work with high efficiency.

When the sensor unit S is pressed against the bar code 70, the trigger switch 100 is closed to energize the light-emitting diode 61 and the decoder 133. Therefore, the light-emitting diode 61 and the decoder 133 can simultaneously be turned on in response to the pressing engagement of the sensor unit S with the bar code 70.

The DC power supply Br, which is relatively heavy, is placed in the decoder unit D, and the decoder unit D is mounted on the wrist 12. Consequently, the decoder unit D is stably supported on the wrist 12 and does not impose an undue load on the index finger 11. The bar code reader is highly portable as the sensor unit S on the index finger 11 and the decoder unit D on the wrist 12 are relatively closely spaced from each other.

Recent bar code label printing technology allows bar codes to be printed with a high density ranging from 300 to 600 dpi. For example, an ITF code representing 8-figure bar code information can be printed with a bar width ranging from 5 to 7 mm. Such a small bar code can well be read by the bar cod reader according to the present invention as the rod lens array 80 can produce a bar code image with no size reduction.

Figure 10:
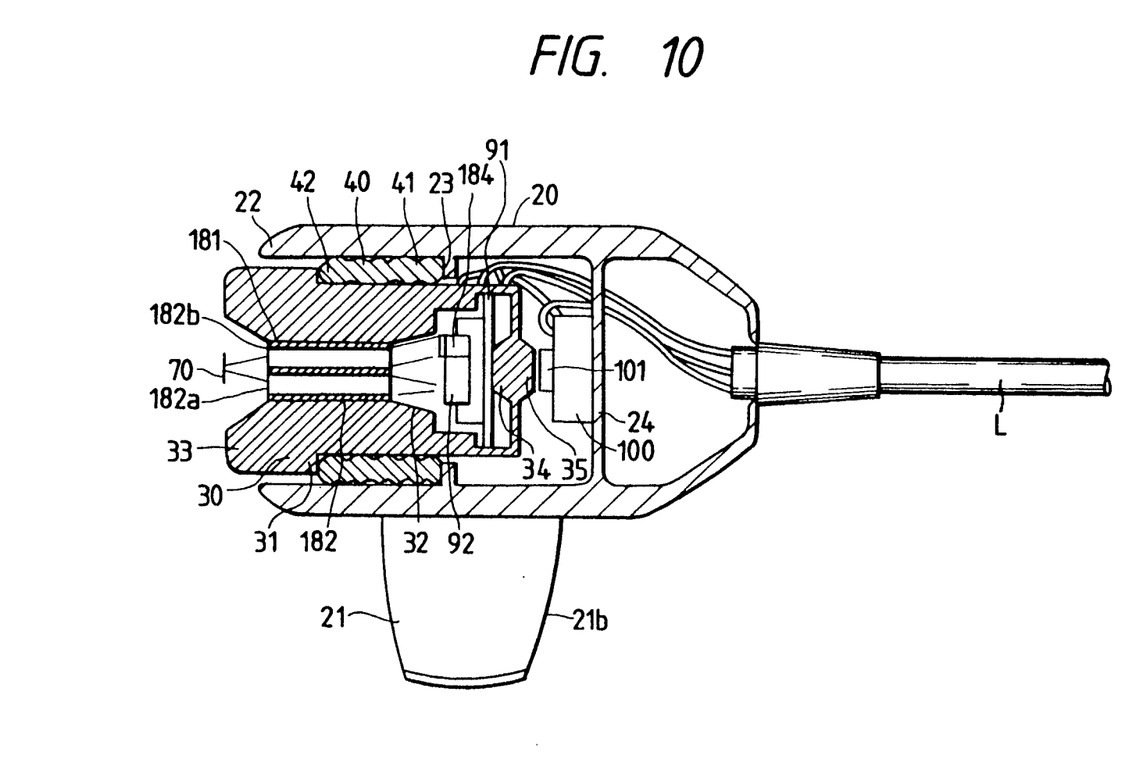
FIG. 10 is a vertical cross-sectional view of the sensor unit of a bar code reader according to another embodiment of the present invention.
Figure 11:
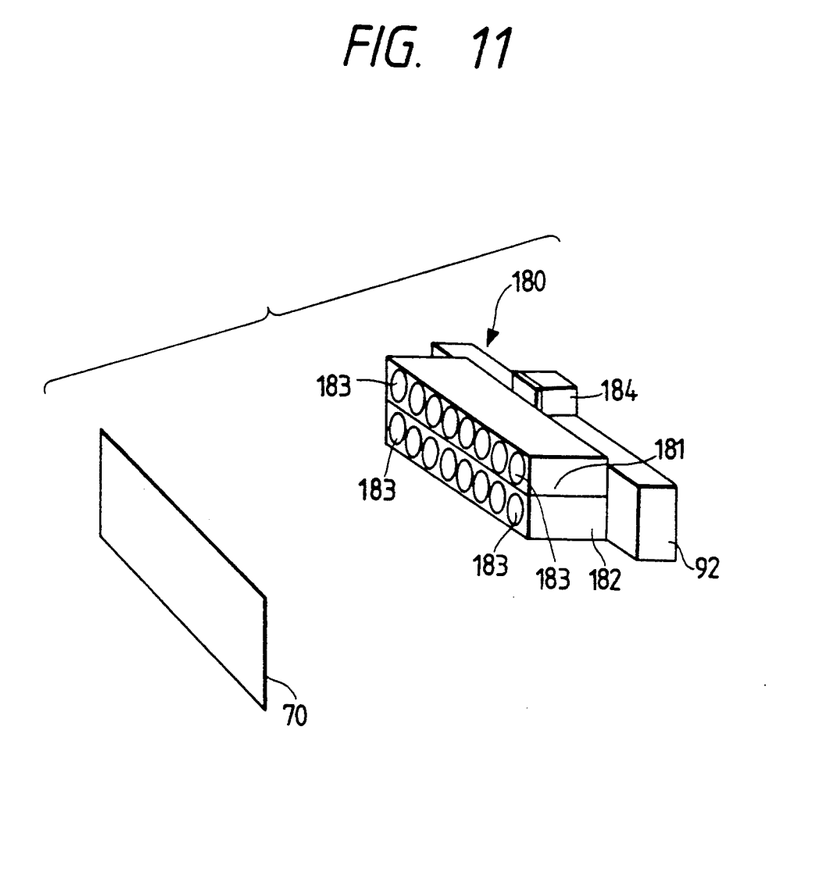
FIG. 11 is a perspective view of a bar code, and a rod lens array and a diffusion plate of the sensor unit shown in FIG. 10.

FIGS. 10 and 11 show a bar code reader according to another embodiment of the present invention. Those parts shown in FIGS. 10 and 11 which are identical to those of the bar code reader according to the preceding embodiment are indicated by identical reference characters, and will not be described in detail.

As shown in FIGS. 10 and 11, the sensor unit of the bar code reader has a rod lens array assembly 180 comprising a first rod lens array 181 composed of a plurality of parallel spaced rod lenses 183 and a second rod lens array 182 composed of parallel spaced rod lenses 183. The first rod lens array 181 is mounted on the second rod lens array 182 in vertical alignment with each other, and their rod lenses 183 extend parallel to each other. A light-emitting diode 184 is disposed on the CCD 92.

Light emitted by the light-emitting diode 184 enters the first rod lens array 181, travels along periodic curved ray trajectories therethrough, and are emitted from exit ends 182b of the rod lenses 183 toward the bar code 70. The light applied from the first rod lens array 182 to the bar code 70 is reflected by the bar code 70 into the second rod lens array 182 from entrance ends 182a of the rod lenses 183, travels along periodic curved ray trajectories therethrough, and are emitted from exit ends toward the CCD 92.

The rod lens array assembly 180 is used not only as a focusing means for focusing a bar code image on the CCD in substantially the same size as the bar code 70, but also as a light guide for guiding the light from the light-emitting diode 184 toward the bar code 70. Therefore, the movable flat tubular body 30 is not required to have an extra space which would otherwise be necessary to accommodate a separate light guide such as a diffusion plate. The flat tubular body 30, which serves as a switch mechanism, is thus made compact for greater mechanical strength.

Inasmuch as the light emitted by the light-emitting diode 184 is focused onto the bar code 70 by the rod lenses 183 of the first rod lens array 181, the intensity of the light applied from the first rod lens array 181 to the bar code 70 is much higher than when the light is applied from the diffusion plate 50 (see FIG. 4) to the bar code 70. As a consequence, the power requirement of the light-emitting diode 184 may be reduced.

The reduced power requirement of the light-emitting diode 184 is particularly advantageous for portable, hand-supported bar code readers. More specifically, it is desirable for such a portable, hand-supported bar code reader to be as small and light as possible because it is mounted on an operator's hand and finger and should not be physically fatiguing the operator in use. If the light-emitting diode 184 has a reduced power requirement, then the DC power supply Br may be smaller in capacity and weight, and the bar code reader, especially the decoder unit D, may be smaller in size and weight.

In the above embodiments, the light-emitting diode 61 or 184 may be disposed in the decoder unit D, and light emitted by the light-emitting diode 61 or 184 may be transmitted over an optical fiber cable to the diffusion plate 50 or the first rod lens array 181 in the sensor unit S.

The sensor unit S may be mounted on any of other fingers, such as a middle finger, of the operator, and the bar code reader may be mounted on the left hand of the operator.

Although certain preferred embodiments of the present invention have been shown and described in detail, it should be understood that various changes and modifications may be made therein without departing from the scope of the appended claims.

I claim:

1. An optical information reader comprising:
   a casing having means for mounting said casing on a finger of an operator;
   a holding member disposed in said casing so as to be movable relative to said casing, said holding member having an open end for abutting against an optical information to be read and a closed end;
   light-emitting means, attached to said holding member, for emitting light through said open end of said holding member toward said optical information;
   graded-index rod lens means, attached to said holding member, for focusing a reflected optical information from said optical information, said graded-index rod lens means having an axis perpendicular to said open end;
   signal output means, attached to said holding member, for outputting an information signal; said signal output means being positioned so that light emitted from said light-emitting means and reflected from said optical information as said reflected optical information is focused by said graded-index rod lens means onto said signal output means, said information signal being representative of said reflected optical information; and
   a decoder for decoding said information signal, said decoder having means for mounting said decoder on an arm of said operator.

2. The optical information reader of claim 1, wherein:
   said graded-index rod lens means comprises an array of graded-index rod lenses; and
   said decoder includes means for decoding said information signal when ends of said array of lenses are positioned parallel to a reading axis of said optical information.

3. The optical information reader of claim 2, wherein said array of graded-index rod lenses comprises a first rod lens array, and a second rod lens array parallel to said first rod lens array, said first rod lens array being arranged to transmit said light emitted from said light-emitting means along periodic curved ray trajectories therethrough and emit the light toward said optical information, and said second rod lens array being arranged to transmit said reflected optical information from said optical information along periodic curved ray trajectories therethrough and emit said reflected optical information toward said signal output means.

4. The optical information reader of claim 1, further comprising switching means, disposed in said casing, for energizing said light-emitting means when said open end abuts against said optical information; said holding member moving, when said open end abuts against said optical information to be read, to actuate said switching means.

5. The optical information reader of claim 4, wherein said switching means energizes said decoder when said open end abuts against said optical information.

6. A bar code reader comprising:
   a sensor unit adapted to be mounted on a finger of an operator, said sensor unit comprising:
   a hollow casing;
   a movable tubular member movably disposed in said hollow casing, said movable tubular member having an end for abutment against a bar code to be read;
   light-emitting means for emitting light toward said bar code to be read, said light-emitting means disposed in said movable tubular member;
   optical means for focusing an entire reflected bar code image at one time, said optical means disposed in said movable tubular member; and
   a line image sensor for photoelectrically converting said entire reflected bar code image, focused by said optical means, into an electric signal; said line image sensor disposed in said movable tubular member; and
   a decoder unit, adapted to be mounted on a wrist of said operator, for decoding said electric signal from said line image sensor; said decoder unit and said line image sensor unit being electrically coupled to each other.

7. The bar code reader according to claim 6, wherein said optical means comprises:
   a first graded-index rod lens array having an array of linearly spaced parallel rod lenses for guiding said light emitted form said light-emitting means toward said bar code; and
   a second graded-index rod lens array having an array of linearly spaced parallel rod lenses for focusing said entire reflected bar code image form said bar code to be read onto said line image sensor.

8. The bar code reader according to claim 6, wherein said optical means comprises a graded-index rod lens array having an array of parallel spaced rod lenses positioned to focus said entire reflected bar code image onto said line image sensor.

9. The bar code reader according to claim 6, wherein said light-emitting means comprises a diffusion plate having an end surface, and a light-emitting device for emitting light through said diffusion plate, from said end surface, toward said bar code to be read.

10. The bar code reader according to claim 6, wherein said sensor unit further comprises
    a switch for energizing said light-emitting means and said decoder unit, said switch being mounted in said hollow casing and adapted to be switched to an on position by said movable tubular member when said end of said movable tubular member is moved into abutment against said bar code to be read.

11. The bar code reader according to claim 10, wherein said sensor unit further comprises resilient means disposed in said hollow casing for normally biasing said movable tubular member so that said switch is in an off position when said first end of said movable tubular member is not abutted against said bar code to be read.

12. A bar code reader according to claim 6, wherein said decoder unit further comprises an electronic circuit for decoding said electric signal from said line image sensor, and a chargeable power supply for energizing said light-emitting means and said electronic circuit.

13. An optical information reader comprising:
    a casing
    a holding member, disposed in said casing and being movable relative to said casing, said holding member having an open end for abutment against an optical information to be read and a closed end;

light-emitting means, attached to said holding member, for emitting light through said open end toward said optical information;

graded-index rod lens means, attached to said holding member, for focusing light reflected from said optical information, said graded-index rod lens means having an axis perpendicular to said open end; and signal output means, attached to said holding member, for receiving said focused light reflected form said optical information and focused by said graded-index rod lens means, and for outputting an information signal representative of said focused light.

14. The optical information reader of claim 13, further comprising a biasing means for biasing said holding member so that said open end of said holding member extends outside said casing, while movable retaining said holding member within said casing.

* * * * *